(12) United States Patent
Anderson et al.

(10) Patent No.: US 7,877,300 B2
(45) Date of Patent: Jan. 25, 2011

(54) SYSTEM AND METHOD FOR PROCESSING ORDERS INVOLVING FULL TRUCK SHIPMENTS

(75) Inventors: Michelle Anderson, Lynnwood, WA (US); Dave Clifford, Renton, WA (US); Ken Frost, Redmond, WA (US)

(73) Assignee: Nintendo of America Inc., Redmond, WA (US)

( * ) Notice: Subject to any disclaimer, the term of this patent is extended or adjusted under 35 U.S.C. 154(b) by 1873 days.

(21) Appl. No.: 10/061,354

(22) Filed: Feb. 4, 2002

(65) Prior Publication Data

US 2002/0173983 A1 Nov. 21, 2002

Related U.S. Application Data

(60) Provisional application No. 60/290,981, filed on May 16, 2001.

(51) Int. Cl.
*G06Q 10/00* (2006.01)
(52) U.S. Cl. ............. 705/28; 705/7; 705/8; 705/26; 705/29; 705/24; 705/27; 705/35; 705/37; 705/38; 705/30; 705/9; 705/10; 705/15; 705/21; 705/40
(58) Field of Classification Search ................ None
See application file for complete search history.

(56) References Cited

U.S. PATENT DOCUMENTS

| | | | | |
|---|---|---|---|---|
| 5,070,463 A | * | 12/1991 | Schuricht et al. | 705/404 |
| 5,715,398 A | * | 2/1998 | Lubenow et al. | 705/7 |
| 6,029,140 A | | 2/2000 | Martin et al. | |
| 6,041,318 A | | 3/2000 | Danford-Klein et al. | |
| 6,076,080 A | * | 6/2000 | Morscheck et al. | 705/400 |
| 6,115,690 A | | 9/2000 | Wong | |
| 6,219,653 B1 | * | 4/2001 | O'Neill et al. | 705/400 |
| 6,353,192 B1 | * | 3/2002 | Thiel | 177/25.15 |
| 6,466,948 B1 | * | 10/2002 | Levitsky et al. | 707/104.1 |
| 6,571,213 B1 | * | 5/2003 | Altendahl et al. | 705/1 |
| 6,801,901 B1 | * | 10/2004 | Ng | 705/28 |
| 6,937,992 B1 | * | 8/2005 | Benda et al. | 705/7 |
| 2002/0188530 A1 | | 12/2002 | Wojcik et al. | 705/28 |
| 2003/0060924 A1 | * | 3/2003 | Ye et al. | 700/217 |

OTHER PUBLICATIONS

Beier, Frederick J and Cross, James. Shortline-client relationships: Can local carriers be more than small railroads? Transportation Journal, v33n2, pp. 5-14, Winter 1993.*

* cited by examiner

*Primary Examiner*—F. Zeender
*Assistant Examiner*—Fawaad Haider
(74) *Attorney, Agent, or Firm*—Nixon & Vanderhye P.C.

(57) ABSTRACT

A system and method of processing an order comprises receiving an order for desired items, and calculating a collective physical parameter(s) of the items such as a total weight of the items, a total volume of the items and/or a total number of cases of the items. The calculated collective physical parameter(s) is compared with a predetermined threshold(s) reflecting a physical capacity or capability of one standard full carrier. The processing of the order is stopped if the collective physical parameter exceeds the threshold.

9 Claims, 5 Drawing Sheets

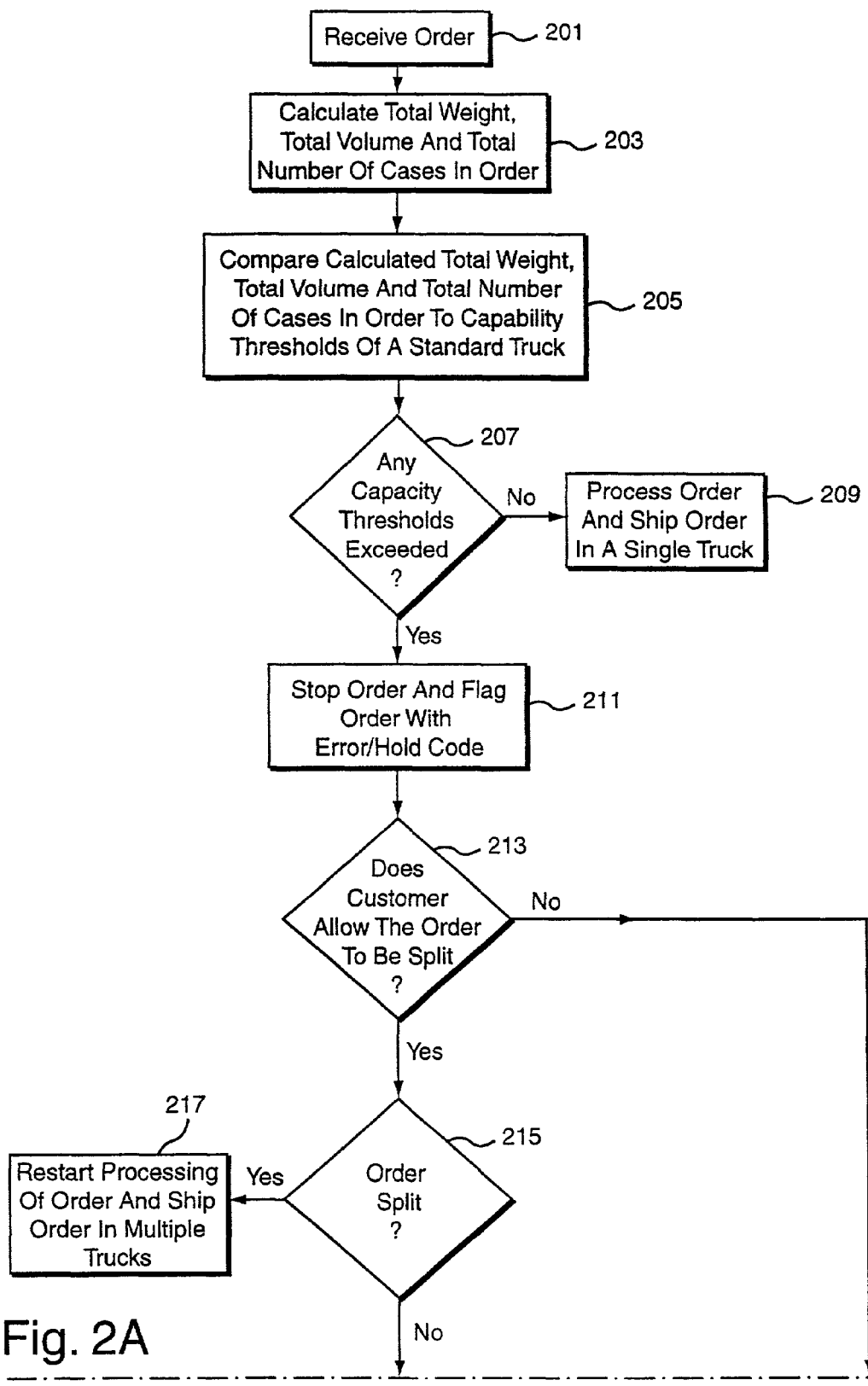

SYSTEM AND METHOD FOR PROCESSING ORDERS INVOLVING FULL TRUCK SHIPMENTS

CROSS REFERENCE TO RELATED APPLICATION

This application claims the benefit of U.S. Provisional Application No. 60/290,981 filed May 16, 2001, the contents of which are incorporated herein by reference.

BACKGROUND

Exemplary non-limiting embodiments of the present invention relates to a system and method of processing orders, and in particular, to a system and method of processing orders that involve full truck shipments.

When a customer places an order with a vendor, the shipment of the items ordered may exceed the physical capabilities of a single truck. For example, the total collective volume of the items ordered may exceed the total cubic volume of a single truck, thereby necessitating the use of multiple, separate trucks to ship all of the ordered items.

A customer, however, may have difficulties in processing a received shipment that is spread out over multiple trucks. Often, the customer's expectation is to receive all of the items specified in a single order as a shipment in a single truck. If the order is spread out over multiple trucks and the customer processes the arrival of the items in only one of the trucks (based upon the customer's belief and expectation that all items are shipped in one truck), the customer may erroneously believe that the shipment is missing some of the ordered items. The customer may then erroneously charge the vendor a penalty fee for the allegedly missing items. When the order is spread out over multiple trucks, it may also be difficult for the customer's receiving system to determine which trucks are carrying the items of a specific order.

It would thus be beneficial for the vendor to implement a system and method of processing orders that will evaluate an order to determine whether the shipment of the items specified in the order exceeds the physical capabilities of a truck carrying the shipment and to notify the vendor if the physical capabilities are exceeded. The vendor may then take appropriate action to further process the order or reject the order entirely.

BRIEF SUMMARY OF THE EXEMPLARY NON-LIMITING EMBODIMENTS

In an exemplary non-limiting embodiment of the present invention, a method of processing an order (and a system for performing the same) comprises receiving an order for items, calculating at least one collective physical characteristic of the items, comparing the at least one collective physical characteristic with at least one predetermined threshold, and determining if the collective physical characteristic exceeds the threshold. The predetermined threshold may reflect a value of at least one physical capability of a standard full carrier of a type of carrier to be used to carry the items. The collective physical characteristic may comprise at least one of a total weight of the items, a total volume of the items and the total number of cases of the items. Alternatively, the at least one predetermined threshold may reflect a physical capability of a carrier that is actually to be used to carry the items.

If the collective physical characteristic exceeds the predetermined threshold, determination may be made whether the ordered items can be split for shipment among multiple carriers by referring to information stored in a profile of a transmitter of the order. The processing of the order is continued if it is determined that the order can be split among multiple carriers.

If the collective physical characteristic exceeds the predetermined threshold, a determination may be made whether any of the items can be canceled from the order. The processing of the order is continued if it is determined that one or more of the items may be canceled from the order so that a collective physical characteristic of the uncanceled items can be calculated that does not exceed the predetermined threshold such as the uncanceled items having a total volume that fits within a carrier to be actually used to carry the uncanceled items. Determining whether any of the ordered items can be canceled may comprise sending an inquiry to a transmitter of the order and receiving a response from the transmitter regarding whether any of the ordered items can be canceled from the order.

If the collective physical characteristic exceeds the predetermined threshold, a determination may be made regarding whether the ordered items can be carried by the actual carrier to be used to carry the items such as determining whether a total volume of the ordered items fits within the actual carrier to be used to carry the items. If so, processing of the order is continued so that the ordered items can be carried by the actual carrier to be used to carry the items.

If the at least one collective physical characteristic exceeds the predetermined threshold, the collective physical characteristic may be compared with at least one respective maximum tolerance that exceeds the value of the at least one predetermined threshold. If the at least one collective physical characteristic exceeds the at least one maximum tolerance limit, a determination may be made whether any of the items can be canceled from the order. If the at least one collective physical characteristic does not exceed the at least one maximum tolerance limit, a determination may be made whether the ordered items can be carried by the actual carrier to be used to carry the items such as determining whether a total volume of the ordered items fits within the actual carrier used to carry the items.

BRIEF DESCRIPTION OF THE DRAWINGS

The above advantages, as well as other advantages of exemplary non-limiting embodiments the invention, will be more completely understood and appreciated by careful study of the following more detailed description of the exemplary non-limiting embodiments of the invention taken in conjunction with the accompanying drawings, in which:

FIGS. 2A-2B is a flow chart illustrating a method of processing orders performed in conjunction with the system illustrated in FIG. 1 and in accordance with an exemplary non-limiting embodiment of the invention.

DETAILED DESCRIPTION OF THE EXEMPLARY NON-LIMITING EMBODIMENTS

Figure 1:
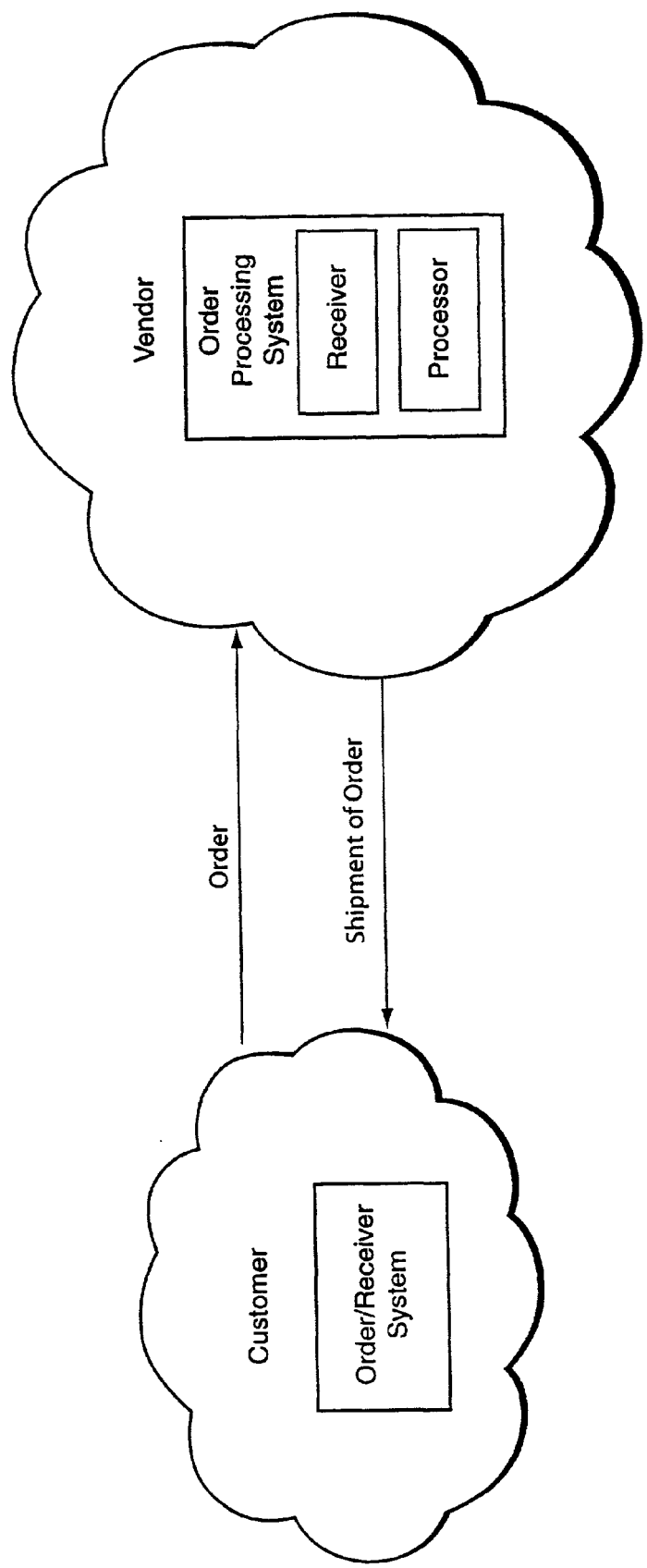
FIG. 1 is a diagram illustrating a system for processing orders in accordance with an exemplary non-limiting embodiment of the invention.

FIG. 1 illustrates, inter alia, a computerized processing system according to an exemplary non-limiting embodiment of the present invention. As illustrated in FIG. 1, the computerized order processing system includes a receiver and a processor. A vendor implementing the order processing system may be capable of receiving orders from a customer having a computerized order and receiving system via the electronic document interchange (EDI), a standard in the shipping industry. Alternatively, the system may receive orders through manual data entry by the vendor's personnel. While only one customer (e.g., a business concern such as a retailer) is shown in FIG. 1, it will be appreciated that a plurality of customers can transmit orders to the vendor via the EDI.

Figure 2B:
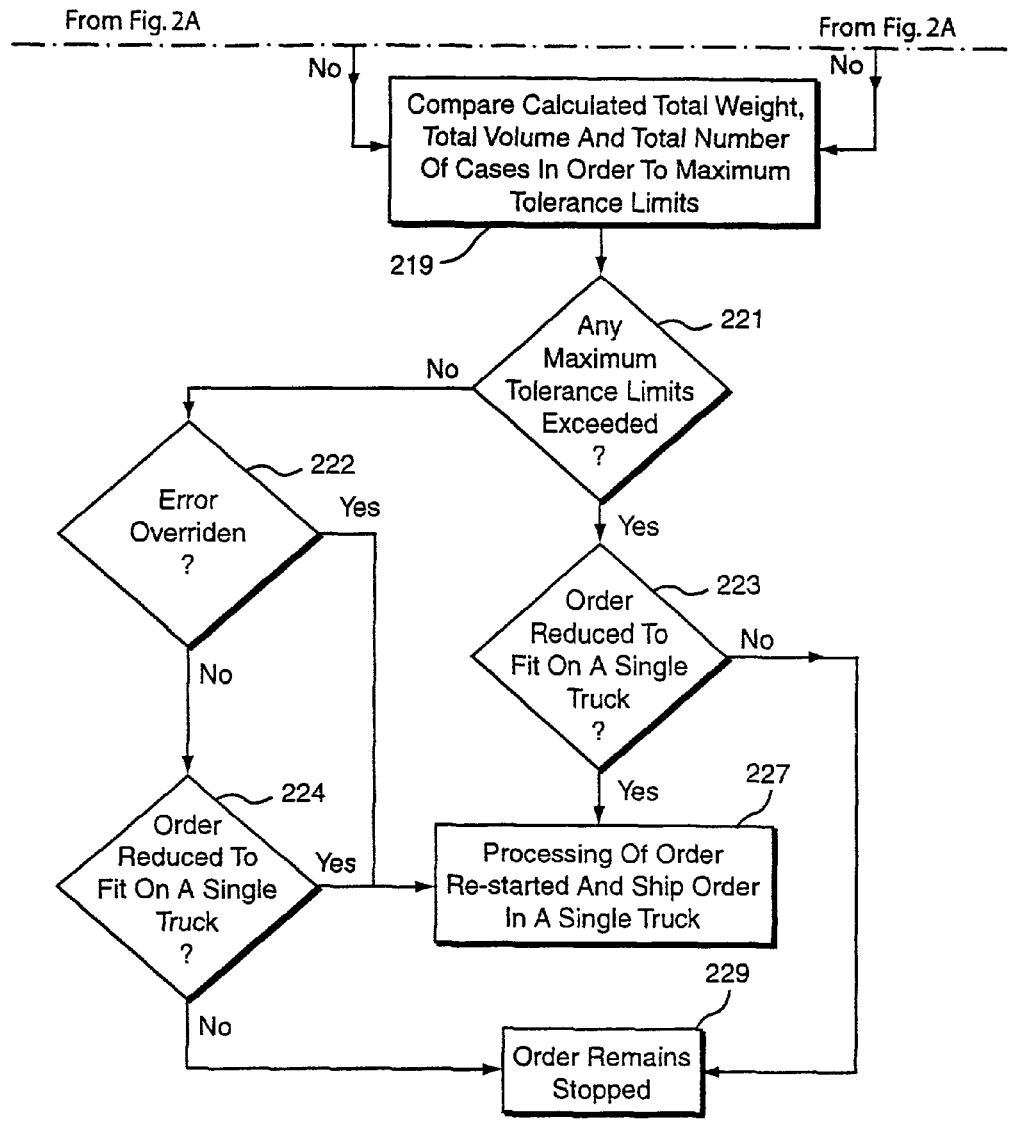

As illustrated in FIG. 1, an order is transmitted by a customer that indicates the item(s) desired from the vendor. As illustrated in FIG. 2, after receiving the order through a receiver (step 201), the processor of the order processing system calculates a number of physical characteristics of the ordered items (step 203). These characteristics include, for example, the items' total collective weight, the items' total collective volume and/or the total number of cases that contain the items (a case can contain one or more items). The calculated physical characteristics of the orders are then compared to respective physical capability thresholds of a "standard full truck" (step 205). For example, the values for physical capability thresholds of a standard truck for total weight carried, total volume carried and total number of cases carried are 40,000 lbs., 2700 cubic feet and 1200 cases, respectively.

The values of the physical capability thresholds of a "standard full truck", or more generally a "standard full carrier", are the values of the physical capabilities (e.g., total volume carried, total weight carried, total number of cases carried, etc.) of a truck which is an average one of the type that is to be used to carry the ordered items when it is fully loaded. These thresholds are stored in a memory (not shown) in or accessible by the order processing system. The thresholds may be adjusted to any appropriate value by the vendor's system administrator or other personnel.

If none of the items' calculated physical characteristics exceeds the respective physical capability thresholds of a standard full truck (step 207), the order is processed and shipped by a single truck (step 209). Since all of the items listed in the order are shipped by a single truck, the customer may be able to receive and track the shipment without difficulty.

If, on the other hand, one or more of the items' calculated physical characteristics exceeds a respective physical capability threshold of a standard full truck (step 207), then the processing of the order will be stopped and the order flagged with an appropriate error/hold code (step 211). The vendor will thus be notified that at least one of the ordered items' physical characteristics exceeds a respective threshold of a standard full truck.

The order processing system stores a customer profile for each of the customers that transmits orders to the vendor. Each of the profiles includes an indication of whether the customer allows an order to be split and spread out over multiple trucks.

The actual truck used to carry the items ordered may not be a standard truck. For example, the actual truck used may have physical capabilities that exceed the capabilities of a standard truck. In addition to a memory that stores the physical capability thresholds of a standard full truck, the order processing system also includes or can access a memory (not shown) that stores maximum tolerance limits for each of the physical capability thresholds. These maximum tolerance limits reflect the maximum values that the ordered items' calculated physical characteristics may exceed the physical capacity thresholds of a standard full truck and actually fit on one specific truck. For example, the maximum values for total weight carried, total volume carried and total number of cases carried beyond the thresholds of a standard full truck are an additional 2000 lbs., 120 cubic feet and 48 cases, respectively. The maximum tolerance limits for determining whether the ordered items may actually fit on a single specific truck in the foregoing example is therefore 42,000 lbs. (40,000+2000 lbs.), 2820 (2700+120 cubic feet), and 1248 cases (1200+48 cases). The maximum tolerance limits may, however, be changed to different values by the vendor's system administrator or other personnel.

If the processing of the order is stopped and flagged (step 211), the order processing system then determines whether the customer transmitting the order allows the order to be split and spread out over multiple trucks by referring to the customer's stored profile (step 215). If so, the processing of the order is restarted and the ordered items are split among multiple trucks (step 217). The order processing system and/or vendor's administrator will determine how many trucks are needed. For example, the order processing system will spread the items over as many trucks as necessary to avoid the physical capability thresholds of a single standard full truck from being exceeded. Alternatively, the items may be spread out over as many trucks as necessary to avoid the maximum tolerance limits of any one of the trucks from being exceeded if the vendor's administrator also confirms that the order will actually fit on the specific trucks being used.

If the customer does not allow the ordered items to be split and spread out over a plurality of trucks (step 213), or if the order is not split despite the customer allowing such a split (step 215), the ordered items' collective physical characteristics (e.g., total weight, total volume and/or total number of cases) are compared to the stored maximum tolerance limits (step 219).

If any of the maximum tolerance limits are exceeded (step 221), the vendor's administrator will contact the customer or make an individual decision whether to reduce the quantity of items in the order so that the remaining items can be loaded and shipped using a single truck (step 223). The item(s) canceled from the order can be re-ordered in a separate order from the customer. If the order is reduced so that the remaining items can be loaded and shipped using a single truck (e.g., reduced below the physically capability thresholds of a standard full truck or reduced below the maximum tolerance limits with the vendor's confirmation that the remaining items will actually fit on the specific truck being used), then the processing of the order will be restarted (step 227) and the order ultimately shipped using a single truck. If the order is not reduced to fit into a single truck (step 223), the order will remain stopped (step 229) and ultimately rejected unless appropriate corrective action occurs such as the customer waiving the requirement that the order cannot be split and verifying that no penalty fee will charged to the vendor.

If, on the other hand, none of the maximum tolerance limits are exceeded (step 221), then a determination will be made whether to override the error (step 222) to enable the processing of the order to be restarted (step 227). The determination would be made to override the error (i.e., override the stoppage of the order's processing) if the vendor's administrator confirms that the order will actually fit on the specific truck being used. This could occur, for example, if the specific truck being used has a larger physical capacity than a standard truck. If the error is not overridden (step 222), the vendor's administrator will contact the customer or make an individual decision whether to reduce the quantity of items in the order so that the remaining items can be loaded and shipped using a single truck (step 224). If the order is reduced so that the remaining items can be loaded and shipped using a single truck (e.g., reduced below the physical capacity thresholds of a standard truck or reduced to a point so that the vendor's administrator can confirm that the remaining items will actually fit on the specific truck being used), then the processing of the order will be restarted (step 227) and the order ultimately shipped. If the order is not reduced (step 224), the order will remain stopped (step 229) and ultimately rejected unless appropriate corrective action occurs such as the customer waiving the requirement that the order cannot be split and verifying that no penalty fee will charged to the vendor.

Exemplary non-limiting embodiments of the present invention will thus enable the vendor to detect when an order lists items having a collective physical characteristic which may exceed the physical capability of a single truck. Exemplary non-limiting embodiments of the present invention will also help the vendor to avoid shipping products for a single order in separate trucks, unless each shipment has its own set of shipping documentation or unless permitted by the customer. The vendor will thus be able to enhance customer service and reduce the number of penalty fees filed from the customer for allegedly failing to send all of the items ordered.

Figure 3A:
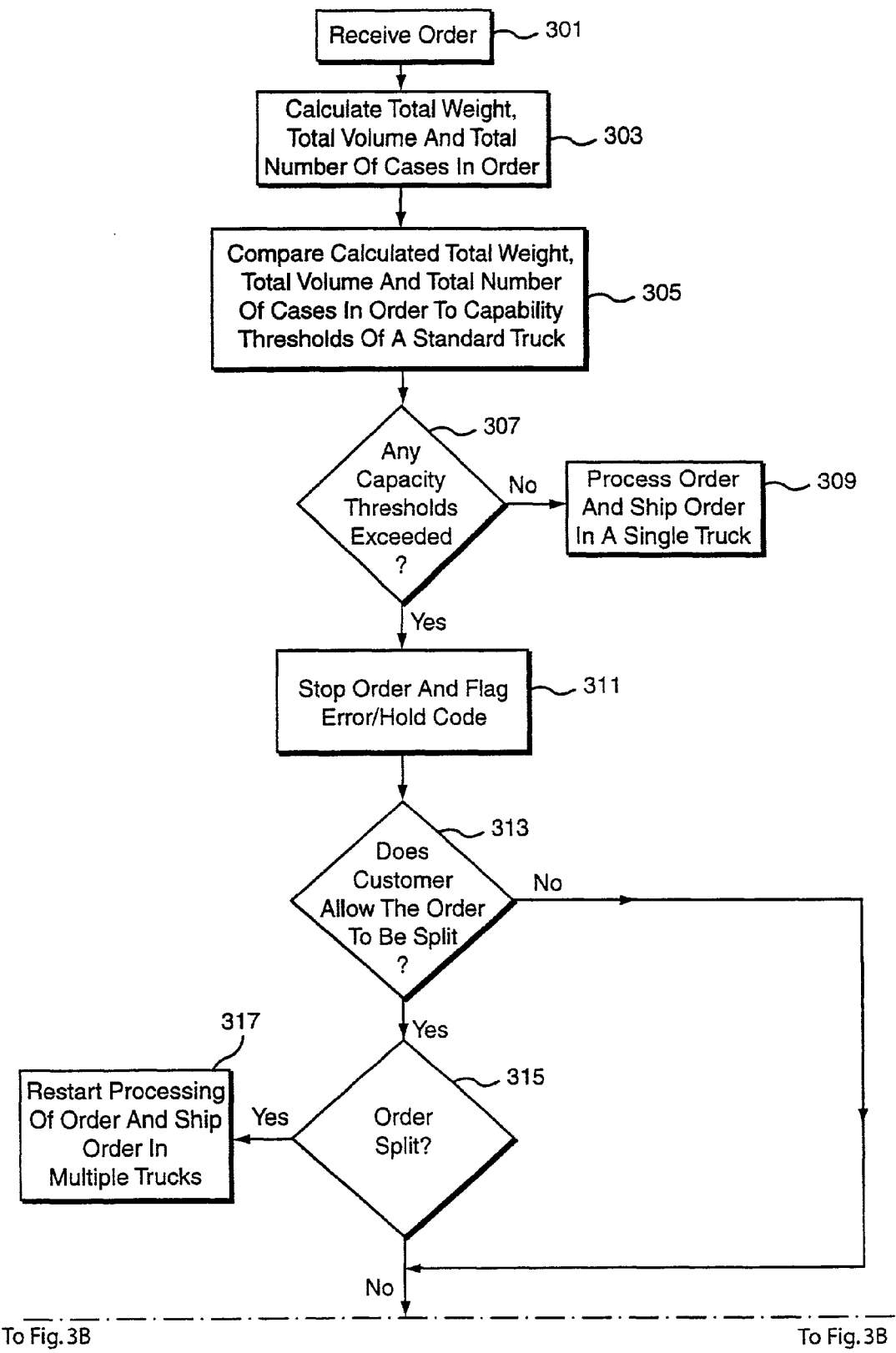
FIGS. 3A-3B is a flow chart illustrating a method of processing orders performed in conjunction with the system illustrated in FIG. 1 and in accordance with another exemplary non-limiting embodiment of the invention.
Figure 3B:
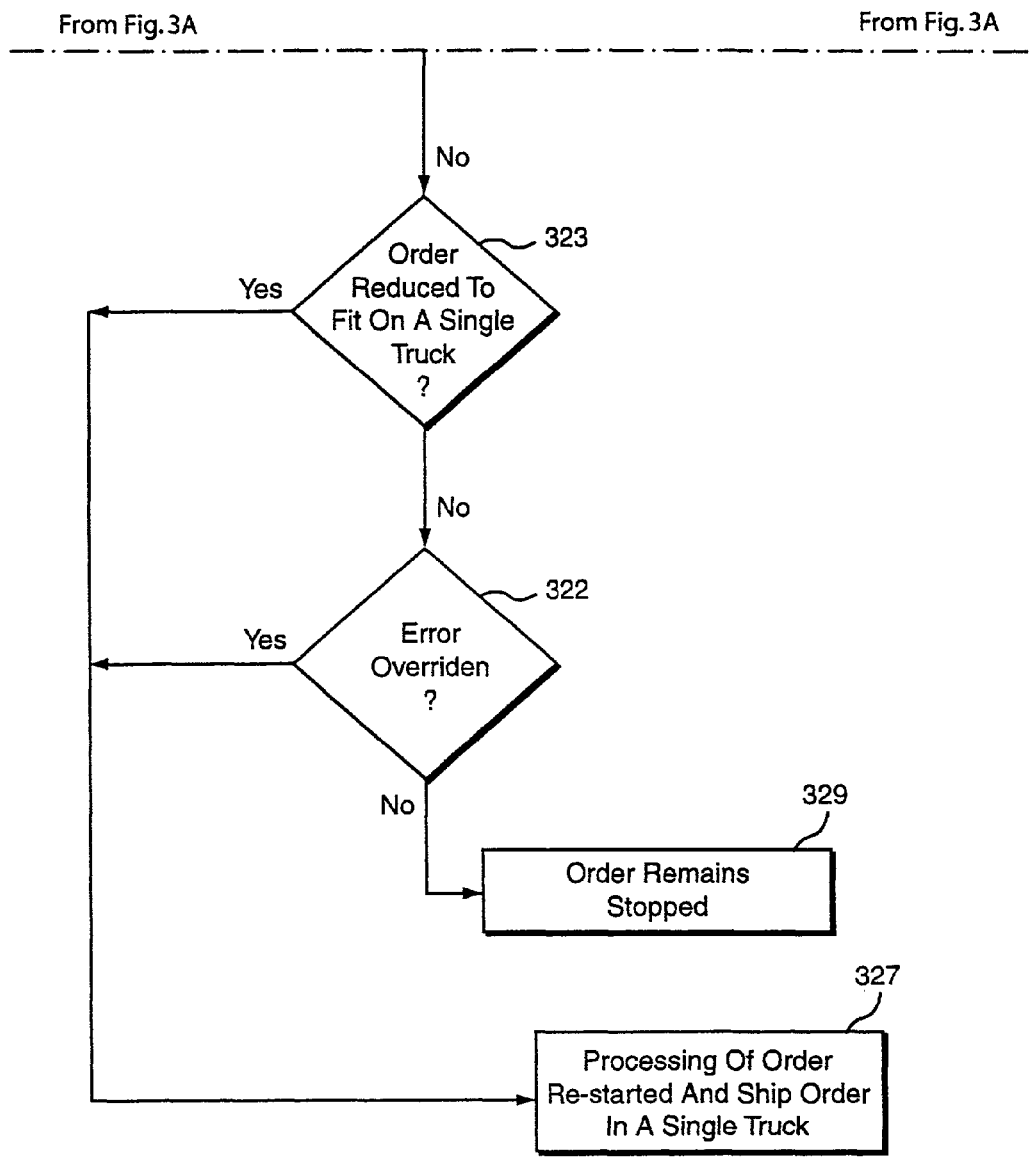

FIGS. 3A-3B illustrate another exemplary non-limiting embodiment of the invention. Only the differences from the exemplary embodiment illustrated in FIGS. 2A-2B will be discussed in detail. As will be appreciated from the discussion below, the embodiment illustrated in FIGS. 3A-3B does not include the use of maximum tolerance limits like the embodiment illustrated in FIGS. 2A-2B. Steps in the range 301-317 of FIGS. 3A-3B are the same as the corresponding steps in the range 201-217 of FIGS. 2A-2B.

If the customer does not allow the ordered items to be split and spread out over a plurality of trucks (step 313), or if the order is not split despite the customer allowing such a split (step 315), the vendor's administrator will contact the customer or make an individual decision whether to reduce the quantity of items in the order so that the remaining items can be loaded and shipped using a single truck (step 323). The item(s) canceled from the order can be re-ordered in a separate order from the customer. If the order is reduced so that the remaining items can be loaded and shipped using a single truck (e.g., reduced below the physical capacity thresholds of a standard truck or reduced to a point so that the vendor's administrator can confirm that the remaining items will actually fit on the specific truck being used), then the processing of the order will be restarted (step 327) and the order ultimately shipped using a single truck.

If the order is not reduced so that it can be shipped using a single truck (step 323), then a determination will be made whether to override the error (step 322) to enable the processing of the order to be restarted (step 327) and order shipped using a single truck. The determination would be made to override the error (i.e., override the stoppage of the order's processing) if the vendor's administrator confirms that the order will actually fit on the specific truck being used. This could occur, for example, if the specific truck being used has a larger physical capacity than a standard truck. If the error is not overridden (step 322), the order will remain stopped (step 329) and ultimately rejected unless appropriate corrective action occurs such as the customer waiving the requirement that the order cannot be split.

The embodiment illustrated in FIGS. 3A-3B can be modified, by using the actual physical capacity thresholds (if known) of the specific truck being used to ship the order instead of the physical capability thresholds of a standard full truck. The ordered items' total weight, total volume and/or total number of cases would thus be compared to the physical capability thresholds of the specific truck actually being used in step 305. This would enable the order processing system to determine precisely how many item(s), if any, needed to be deleted from the order in step 323 for the remaining items to fit on the truck used.

While the embodiments discussed above involve the use of truck to ship the ordered item(s), it will be understood that the exemplary non-limiting embodiments of the present invention are equally applicable to other carriers such as airplanes, vans, etc. The values of physical capability thresholds and maximum tolerance limits discussed above would be adjusted accordingly.

While the exemplary non-limiting embodiments of the invention have been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A system for processing an order comprising: a receiver that receives an order for items from a transmitter of the order; and a processor which:

subsequent to receiving the order, calculates at least one collective physical characteristic of the items in the order received from the transmitter of the order; compares the at least one calculated collective physical characteristic with at least one predetermined threshold corresponding to a value of at least one physical capability of a standard full carrier of a type of carrier to be used to carry the items; determines if the calculated collective physical characteristic exceeds the threshold; and if the calculated collective physical characteristic exceeds the predetermined threshold, determines whether the ordered items may be split for shipment among multiple carriers.

2. The system of claim 1 wherein the at least one predetermined threshold reflects a value of the at least one physical capability of a standard full carrier of a type of carrier to be used to carry the items.

3. The system of claim 1 wherein the at least one calculated collective physical characteristic comprises at least one of a total weight of the items, a total volume of the items or the total number of cases of the items.

4. The system of claim 1 wherein the processor continues the processing of the order if it is determined that the order may be split among multiple carriers.

5. The system of claim 1 wherein the processor, if the calculated collective physical characteristic exceeds the predetermined threshold, determines whether any of the items may be canceled from the order.

6. The system of claim 5 wherein the processor continues the processing of the order if it is determined that any of the items may be canceled from the order.

7. The system of claim 5 wherein the processor cancels one or more of the items from the order so that a collective physical characteristic of the uncanceled items can be calculated that does not exceed the predetermined threshold.

8. The system of claim 1 wherein the at least one predetermined threshold reflects a physical capability of the single carrier actually to be used to carry the items.

9. A system for processing an order comprising:

a receiver that receives an order for items from a transmitter of the order; and a processor which:

subsequent to receiving the order, calculates at least one collective physical characteristic of the items in the order received from the transmitter of the order;

compares the at least one calculated collective physical characteristic with at least one predetermined threshold corresponding to a value of at least one physical capability of a standard full carrier of a type of carrier to be used to carry the items; determines if the calculated collective physical characteristic exceeds the threshold; and if the calculated collective physical characteristic exceeds the predetermined threshold, determines whether the ordered items may be split for shipment among multiple carriers by referring to information stored in a profile of a transmitter of the order.

* * * * *